3,075,279
METHOD OF PROVIDING A BEARING SURFACE
Arthur J. Haltner and Curtis S. Oliver, Schenectady,
N.Y., assignors to General Electric Company, a corporation of New York
No Drawing. Filed July 30, 1959, Ser. No. 830,481
2 Claims. (Cl. 29—149.5)

This invention relates to lubricant films between relatively moving elements and more particularly to a film lubricant formed by molybdenum disulfide.

Experience has shown that the most practical use for a solid lubricant is as a surface film on one or both of generally metallic surfaces to be lubricated. Commercial preparations which are widely used employ organic resins to bond the solid lubricant to the given surface. The presence of the organic material, of course, alters the properties of the film. Usually, the thermal resistance of the binder falls far short of that of the inorganic solid lubricant, thus, imposing a high temperature limit on the usefulness of the film which is lower than that of the lubricant itself. Furthermore, the load carrying ability of these resin bonded films under severe conditions is less than desired.

A widely used lubricant is molybdenum disulfide which requires suitable binders to hold the material in place or, alternately, requires a binder to hold the lubricant in a stick form which is continually in engagement with a bearing surface. In copending application, S.N. 830,482, filed concurrently herewith and assigned to the same assignee as the present invention, it has been disclosed that molybdenum disulfide combined with additives, such as CaS, calcium sulfide, $SnS_2$, stannic sulfide, CdS, cadmium sulfide, BaS, barium sulfide, $Ag_2S$, silver sulfide, $Bi_2S_3$, bismuth tri-sulfide, $Cr_2S_3$, chromium tri-sulfide, and $Sb_2S_5$, antimony pentasulfide, display excellent lubrication characteristics in that the wear features of the film and load carrying ability are considerably improved over a $MoS_2$ film alone. While $MoS_2$ combined with an additive is an excellent dry lubricant, the similar problems of a suitable binder, methods of attaching the film to a given surface, and generally obtaining effective utilization of the dry lubricant in special applications are limiting.

It is, therefore, an object of this invention to effectively utilize $MoS_2$ as a solid lubricant on metal surfaces.

It is a further object of this invention to effectively utilize the lubrication characteristics of $MoS_2$ combined with an additive as a solid lubricant on metal surfaces.

It is yet another object of this invention to provide an improved method of attaching a lubricant film to a surface requiring lubrication.

It is a further object of this invention to eliminate continual application of a solid lubricant to a bearing surface.

It is another object of this invention to provide a thin coherent film on a metal surface without the use of a binder.

While it is generally known that $MoS_2$ is a good dry lubricant material, and that in the aforementioned application, $MoS_2$ combined with an additive is an improved dry lubricant, the effectiveness of these lubricants is increased when a film of the material is utilized between relatively moving parts. The most simple way of applying a film of a dry lubricant to a given surface is merely by rubbing the lubricant on the surface to thereby form a film. However, such a film, although greatly improved by an additive to $MoS_2$, is generally of short duration and low load carrying ability. The addition of various binders in the past has established a limit on the lubricating characteristics of the lubricant as based upon the binder rather than the lubricant itself. It has been discovered that an $MoS_2$ film can be applied directly to a given surface without the use of the binder by a process related to rubbing or burnishing. The force maintained between the molybdenum disulfide and the surface to which the film is to be attached must be greater than the force usually contemplated in the term "rubbing" and in most instances is great enough to be just under the crumbling or breaking strength of the $MoS_2$. The force applied is generally sufficient to positively attach the film to the metal surface. The film may not then merely be wiped off. For example, in the practice of this invention, to apply a film to a shaft, the shaft may be mounted in a lathe or other similar apparatus and a small diameter pellet of the lubricant material, suitably attached to a holder, is forced against the shaft and moves along the shaft to provide a film of the desired width. Only a few passes along the shaft are necessary, since a maximum buildup of the lubricant film is soon reached and no additional benefit is gained by further application. Such lubricating films may be applied to various materials, including metal. Best results were obtained when practicing this invention upon metals, for example, chromium, cast iron and stainless steels.

A preferred sub surface to a lubricant film has been found to be generally crack free, impervious chromium, kept in a clean state until just prior to the application of the film.

In one example, the chromium utilized existed as a thick plate, .52–1.0 mil on a suitable hard base, for example, 1090 steel. The surface hardness of the chromium plate was measured and found to be about 950 on the Vickers scale. Best results were obtained when the plate was previously burnished before the application of the chromium, since much of the smoothness of the substrate, 1090 steel, is retained by the chromium plate. Chromium may also be suitably attached to a different metal or non-metal surface.

*Example I*

An $MoS_2$ film was applied to a chromium plate as described above from pure pellets, α molykote microsize $MoS_2$. A 5/16" diameter pellet with an applied load of 2 kg. was rubbed on the plate at a speed of 100 feet per minute. A thin haze of $MoS_2$ formed almost instantly followed by a slow increase as rubbing continued.

The film as obtained in the above example was tested by having a 1/8" diameter steel hemisphere loaded gradually from zero with 50–100 gram increments while running on the film. This rubbing geometry imposed a severe test on the $MoS_2$ film. Apparent areas of contact are quite small and in many instances, apparent pressures on the order of 50,000 p.s.i. are observed. This indicates a case of extreme pressure lubrication. Further testing of various numbers of films obtained in accordance with Example I indicates that failure of the film did not occur until about 2.6 kg. load was obtained.

*Example II*

A film acquired in accordance with the teachings of Example I was utilized under tests as above described for a total time of 30 hours. During this run, exposure was made to water vapor in the range of partial pressures from 0 to 25 millimeter of mercury. At the termination of this test, the film was still intact with a coefficient of friction in dry nitrogen of .03.

*Example III*

Similar tests made on $MoS_2$ containing an additive of about 10% by weight of $SnS_2$ carried a load of 6.1 kg. with the film remaining intact. The ultimate load carrying ability of this film could not be determined. The coefficient of friction was .017.

It has been found that the lubricant film on a metal surface may be improved by burnishing the film. For example, a film acquired on a chromium surface as described in Example I was burnished by a steel ball in the same manner as the term "burnishing" is applied to metal working. The steel ball in this application was pressed into the chromium surface sufficiently to metal work the chromium and one pass was made across the film. There appeared to be two included benefits of this burnishing action. A stronger bond between the $MoS_2$ and the metal is produced and the burnishing provides a thin smooth film having optimum frictional properties.

It may be seen that the objects and features of our invention are obtained by applying a lubricant film directly to a surface, such as a metal surface, for example, cast iron, chromium and stainless steel by forcing the solid lubricant against the surface under high pressure to provide a lubricant film which is strongly attached to the surface and which displays excellent lubricating characteristics. An additional burnishing of the lubricant film increases the optimum performances.

One of the advantages of such a film is that, once applied, the film serves as the only lubrication necessary over long periods of time and continuous or frequent applications of additional film are not required although it is contemplated that the film may be replenished when necessary. The lubricant, together with additives of the copending application provides good results when applied according to the teachings of this invention.

The shaft of a very small fan motor, such as employed to maintain air circulation in freezers, having an applied film of $MoS_2$, has been in substantially continuous operation over a period of a year with no additional lubrication provided or necessary.

While specific methods of this invention have been shown and described, it is not desired that the invention be limited to the particular description and it is intended by the appended claims to cover all modifications within the spirit and scope of this invention.

What we claim as new and desire to secure by Letters Patent of the United States is:

1. A method of providing a bearing surface for utilization in a sliding bearing relationship which consists essentially of:

(a) providing a clean crack free chromium surface,
   (b) frictionally engaging said chromium surface with a solid form of $MoS_2$,
   (c) moving said $MoS_2$ over said chromium surface with a force sufficient to positively attach a thin film of $MoS_2$ thereto,
   (d) engaging said $MoS_2$ film with a hard surface burnishing tool sufficient to permanently indent said chromium surface, and
   (e) moving said burnishing tool across said surface by regular progressive straight line motion to burnish said surface by metal working technique and to provide a smooth bearing surface.

2. A method of providing a bearing surface for utilization in a rotary sliding bearing relationship which consists essentially of:

(a) providing a cylindrical metal member having a clean crack free chromium surface thereon,
   (b) frictionally engaging said chromium surface with a pellet of $MoS_2$,
   (c) moving said $MoS_2$ pellet over said chromium surface with a force sufficient to positively attach a thin film of $MoS_2$ thereon,
   (d) positioning said cylindrical member for rotation about its longitudinal axis,
   (e) engaging said film of $MoS_2$ with a hard arcuate surfaced burnishing tool sufficient to permanently indent said chromium, and
   (f) rotating said cylindrical member with the said burnishing tool so engaged so that the burnishing tool traverses said cylindrical member in one pass to burnish the $MoS_2$ into the chromium surface and to provide a smooth chromium surface.

References Cited in the file of this patent

UNITED STATES PATENTS

| | | |
|---|---|---|
| 2,058,143 | Flanders | Oct. 20, 1936 |
| 2,179,824 | Kip | Nov. 14, 1939 |
| 2,387,872 | Bell | Oct. 30, 1945 |
| 2,673,818 | Woog | Mar. 30, 1954 |
| 2,788,301 | Moore et al. | Apr. 9, 1957 |
| 2,955,958 | Brown | Oct. 11, 1960 |

FOREIGN PATENTS

| | | |
|---|---|---|
| 707,065 | Great Britain | Apr. 14, 1954 |